United States Patent [19]

Yasuno et al.

[11] Patent Number: 5,328,533
[45] Date of Patent: Jul. 12, 1994

[54] BEAD APEX APPLYING METHOD AND DEVICE

[75] Inventors: Osamu Yasuno; Kouji Tsukamoto; Toshikazu Okada; Yukihisa Tanaka; Yoshiaki Nakajima, all of Aichi, Japan

[73] Assignee: Sumitomo Rubber Industries, Ltd., Kyogo, Japan

[21] Appl. No.: 768,760

[22] PCT Filed: Feb. 15, 1990

[86] PCT No.: PCT/JP90/00183
§ 371 Date: Oct. 15, 1991
§ 102(e) Date: Oct. 15, 1991

[87] PCT Pub. No.: WO91/12127
PCT Pub. Date: Aug. 22, 1991

[51] Int. Cl.⁵ .............................................. B29D 30/48
[52] U.S. Cl. ................................ 156/136; 156/130.7; 156/304.1; 156/398; 156/422; 156/460
[58] Field of Search ............... 156/136, 422, 460, 135, 156/130.7, 398, 304.1, 304.5

[56] References Cited

U.S. PATENT DOCUMENTS 1,759,669  5/1930  Stevens .
1,944,768  1/1934  Stevens .
4,196,036  4/1980  Allen et al. ............................ 156/422
4,795,522  1/1989  Orendorf et al. ..................... 156/398
4,933,034  6/1990  Kokubu et al. ....................... 156/136

FOREIGN PATENT DOCUMENTS 88979     7/1979  Japan .
69148     6/1981  Japan .
152937    9/1982  Japan .
259436   12/1985  Japan .
90736     4/1989  Japan .
195030    8/1989  Japan .

Primary Examiner—Geoffrey L. Knable
Attorney, Agent, or Firm—Wegner, Cantor, Mueller & Player

[57] ABSTRACT

A method and a device for applying an apex (13) to the outer peripheral surface of a bead ring (12) prior to assembling a bead portion with a tire carcass in manufacture of an air-filled tire, wherein the apex is fed from one end thereof to the outer peripheral surface of the bead ring (12) and applied thereto as it is wound with rotation of the bead ring (12), the rotation is interrupted to clamp the rear portion of the apex and cut to length, the rotation is resumed to apply the remainder and the rear end of the apex is then move along a circular arc convex toward the bead ring to form the joint portion.

5 Claims, 17 Drawing Sheets

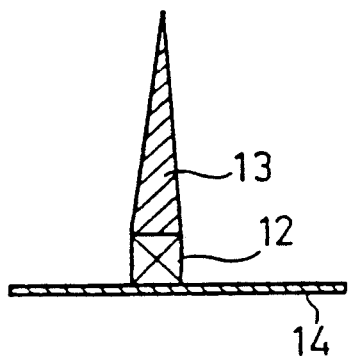
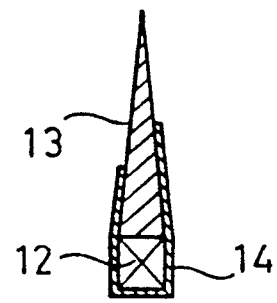
FIG. 13a  FIG. 13b
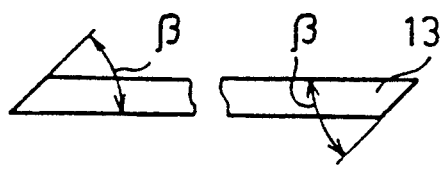
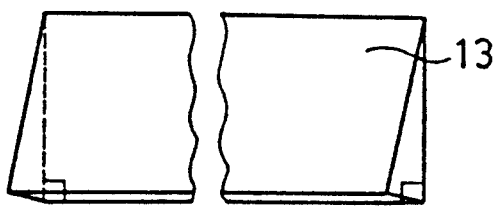
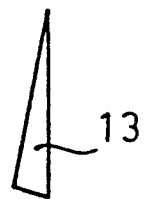
FIG. 14a
FIG. 14b  FIG. 14c

BEAD APEX APPLYING METHOD AND DEVICE

TECHNICAL FIELD

This invention relates to a bead apex applying method and device used in manufacture of an air-filled tire of an automobile for annularly applying a rubber layer having a relatively slender triangular cross-section, which is formed by extrusion and referred to as an "apex", to the outer peripheral surface of a bead ring prior to forming a bead portion of the tire and, also, to such method and device which enable application of a belt-shaped bead filler at the same time as application of the apex.

BACKGROUND TECHNIQUE

As main prior art used for applying an apex to the outer peripheral surface of a bead ring, there are those described in the Japanese patent publication gazette Nos. S51-29551 and S61-6782. In the former, there are described that an apex is fed from its one end onto a rotating bead ring suspended by a pair of guide rolls, successively pressed against the peripheral surface of the bead ring by a pair of pressing rolls and applied thereto in annular fashion, that, in the way of application, the bead apex is pinched by a disc roll and a cone roll so as to spread from its inner edge toward its outer edge, that the leading end of the apex having revolved to a predetermined angle is detected and a rear end portion of the apex is cut to a predetermined length, that both end portions of the apex opening in V-shape are clamped by a splicing mechanism and drawn near to cause both cut end surfaces to bond together, after the apex is applied to the whole periphery of the bead ring, and so on.

In the latter, there is a description that a bead ring is held on the periphery of rotatable disc, an apex which is previously cut to a predetermined length is applied to the peripheral surface of the bead ring in annular fashion with rotation of the disc, both side portions of both ends of the apex are clamped by two pairs of clamps (pressing elements) in a state where both ends of the apex face to form a V-shaped gap therebetween, and a thrust force is applied to the clamps by a third mechanism, thereby pulling both V-shaped facing end portions of the apex into butting bond.

When a bead apex having a relatively slender triangular cross-section is applied annularly to a bead ring, a V-shaped gap is inevitably formed at a junction of the leading and rear ends of the apex since there is a difference between the inner circumferential length of the apex put in contact with the peripheral surface of the bead ring and the outer circumferential length thereof including its outer edge portion (tip portion). According to the abovementioned prior art, there are such problems in that the apex may shrink especially in its outer edge portion in the way from the time when it is drawn out to the time when its application to the peripheral surface of the bead ring is completed, which makes the V-shaped gap between the both ends the larger, since both ends of the apex are clamped by clamping tools and drawn near into butting bond after the apex is applied to the peripheral surface of the bead ring, and that the amount of deformation of the end portions of the apex for cancelling the V-shaped gap is locally so significant that the shape of the outer edge of the apex is liable to become irregular in the vicinity of the junction and a clamp mark of the clamps may be left at the junction. The size of the V-shaped gap is not always fixed and some are large and others are small, since the degree of shrinkage varies with viscosity of the apex rubber. When it is clamped for bonding by the abovementioned prior art scissors-type clamping tools which can effect only a limited movement but no free drawing movement directly responding to the size of the V-shaped gap, there is such a problem in that a large operational stroke of the clamping tools set in conformity with a large gap in order to avoid misjoint may cause over joint (excessive bond) for a small gap and a small operational stroke set in conformity with a small V-shaped gap may cause insufficient bond to leave a gap in the junction in case of a large gap, thereby disabling us from obtaining a good joint in any case.

DISCLOSURE OF INVENTION

The apex applying method of this invention is characterized in that a bead ring is supported by its inner peripheral surface so that it can rotate circumferentially at a predetermined position along a vertical or nearly vertical plane, a bead ring applying surface of the top end portion of an apex fed from one end thereof is pressed against a top portion of the outer peripheral surface of the bead ring to support the apex so that it lies substantially along a tangent of the outer periphery of the bead ring at the top thereof, the bead ring is then rotated circumferentially to successively apply the other portion of said apex following the leading end portion to the bead ring with rotation, the rotation of the bead ring is stopped at a predetermined angular position in the way of application, the rear end portion of said apex is clamped at a forepart of a cutting position and cut to a predetermined length, the rotation of the bead ring is then resumed, the rear portion of the apex clamped after cutting to a predetermined length is revolved toward the bead ring and applied thereto in synchronism with the rotation along a circular arc convex downward as it is clamped, and the rear end surface of the apex is butted against the leading end surface thereof to form a joint.

The apex applying device of this invention is characterized, in an apex applying device arranged to support a bead ring by a bead ring supporting mechanism having a rotational driving unit so that it can rotate circumferentially at a predetermined position along a vertical or nearly vertical plane, feed the apex from one end thereof by an apex feeding mechanism, hand over the leading end portion to a pressing mechanism, successively apply the apex to the bead ring by co-operation of the pressing mechanism which presses the apex against a top portion of the peripheral surface of the bead ring and the bead ring supporting mechanism which rotates the bead ring, cut the apex to a predetermined length in a midway thereof and completely apply the remainder thereafter, by a provision of reciprocating the top end portion of said apex feeding mechanism between a retreating (or shunting) position apart from the vicinity of the top portion of the bead ring and an advancing position where the leading end portion of the apex is handed over to said pressing mechanism, a chucking mechanism which can clamp the apex and move along a circular arc convex downward between a forepart position of the fore end portion of the apex feeding mechanism which is in said retreating position and a joint position which is near the top of said bead ring and to which the leading end of the apex moves, and an apex cutting position of a predetermined length cutting mechanism provided between the fore end portion of the apex feeding mechanism which is in said retreating position and the chucking mechanism which is in the forepart position of the fore end portion of the apex feeding mechanism.

According to this invention, the apex is successively applied from its leading end portion to the bead ring, the cutting position of the rear end portion thereof is clamped in its forepart in a midway and cut to a predetermined length, and the rear end portion of the apex which was clamped when it was cut to length is swingable (or moved) along a circular arc convex downward toward the bead ring as it is clamped. Therefore, referring to FIG. 7 wherein a joint position where the leading end surface AF and the rear end surface AR of the bead apex butt against each other is denoted as J and a rotating axis 53 of the chucking mechanism, the joint position J and the center of the bead ring are assumed to lie on a straight line, the leading end surface AF and the rear end surface AR should completely butt against each other neither more nor less at the abovementioned joint position, if a moving distance L1 of the rear end joint surface AR corresponding to an angle of rotation $\theta_1$ of the rear end surface AR is equal to a moving distance L2 of the leading end surface AF corresponding to an angle of rotation $\theta_2$ of the leading end surface AF from a position P of the leading end surface at the apex cutting time to the abovementioned joint position J and an angle $\alpha_1$ between a tangent Q of a bead wire and the leading end surface AF is equal to an angle $\alpha_2$ between the tangent Q of the bead wire and the rear end surface AR at the abovementioned joint position J. Under such a condition in that L1 is equal to L2 and $\alpha_1$ is equal to $\alpha_2$, the leading end surface AF and the rear end surface AR contact with each other in their outer peripheral side and form a gap in their inner peripheral side, if $\theta_1$ is greater than $\theta_2$, and the leading end surface AF and the rear end surface AR contact with each other in their inner peripheral side and form a gap in their outer peripheral side if $\theta_1$ is less than $\theta_2$. Accordingly, this relation can be utilized to determine $\theta_1$ and $\theta_2$ in advance so that the leading and rear end surfaces completely butt against each other neither more nor less, thereby forming the joint of the apex neither more nor less of rubber. If the rear end portion of the apex is swung (or moved) as described above as it is clamped, the apex is applied with the rotation of the bead ring and also its application advances with its revolution and, in the meantime, the angle of the rear end surface varies and comes in conformity with the leading end surface.

According to this method, there may be a shrinkage in the outer peripheral side of the apex applied to the bead ring since the leading end portion of the apex is not subjected to special confinement after its leading end portion is pressed against the peripheral surface of the bead ring. However, since it is arranged to clamp the rear end portion of the apex by the chucking unit after cutting to length and cause the chucking unit to swing or move along a circular arc convex downward to apply the remainder of the apex to the peripheral surface of the bead ring and also join the leading and rear end surfaces, it is possible to completely butt the leading and rear end surfaces of the apex neither more nor less by making the moving distance L1 of the rear end surface corresponding to the angle of rotation $\theta_1$ equal to the moving distance L2 of the leading end surface corresponding to the angle of rotation $\theta_2$ from the position of the leading end surface at the time of cutting the apex and the joint position of the leading and rear end surfaces, and the angle $\alpha_1$ between the tangent Q of the bead wire and the leading end surface equal to the angle $\alpha_2$ between the tangent Q of the bead wire and the rear end surface at the joint position and, therefore, there is neither excess nor lack of rubber and no deformation in the vicinity of the joint portion of the apex. Accordingly, the uniformity of tire is improved to enhance the quality of tire.

According to this method, moreover, it is possible to apply a bead filler to the apex and wind or fold it up on the sides of the apex substantially at the same time with a slight delay from the application of apex to the bead ring.

By using the method of applying the bead filler and folding it up on the apex sides at the same time, the productivity is improved all the more. It is also possible to use, in the device for realizing this method, a drum-shaped bead ring supporting mechanism in addition to the roller-type. However, the roller-type bead ring supporting mechanism is needed for providing a bead filler feeding mechanism in case of executing filler application and winding-up at the same time.

BRIEF DESCRIPTION OF DRAWINGS

The drawings show an embodiment of this invention, wherein

FIG. 14 shows a state of cutting the apex, wherein (a) is plan view, (b) is front view and (c) is a right side view.

BEST MODE FOR EMBODYING INVENTION

Figure 1:
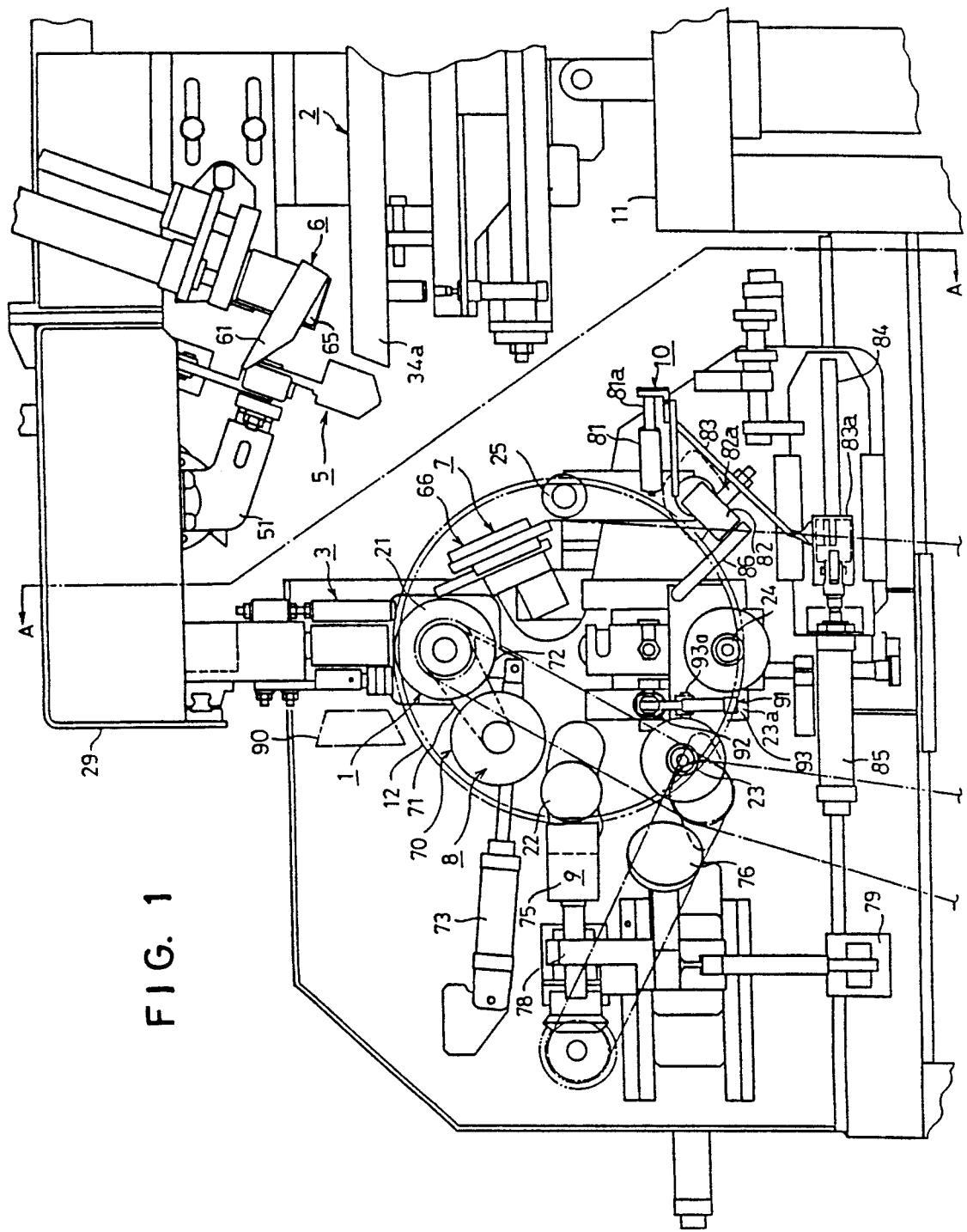
FIG. 1 is a partly enlarged front view showing a main portion viewed from an arrow direction B of FIG. 2.

An embodiment of this invention will be described with reference to FIGS. 1 to 15. The drawings show a schema of a device used for embodying a method of this invention and the device is composed of a bead ring supporting mechanism 1, an apex feeding mechanism 2, a pressing mechanism 3, an apex leading end portion detector (not shown), a chucking mechanism 5, an apex cutting mechanism 6, a bead filler feeding and guiding mechanism 7, a filler winding up mechanism 8, a press roll mechanism 9, a guide roller mechanism 10 and likes.

Figure 2:
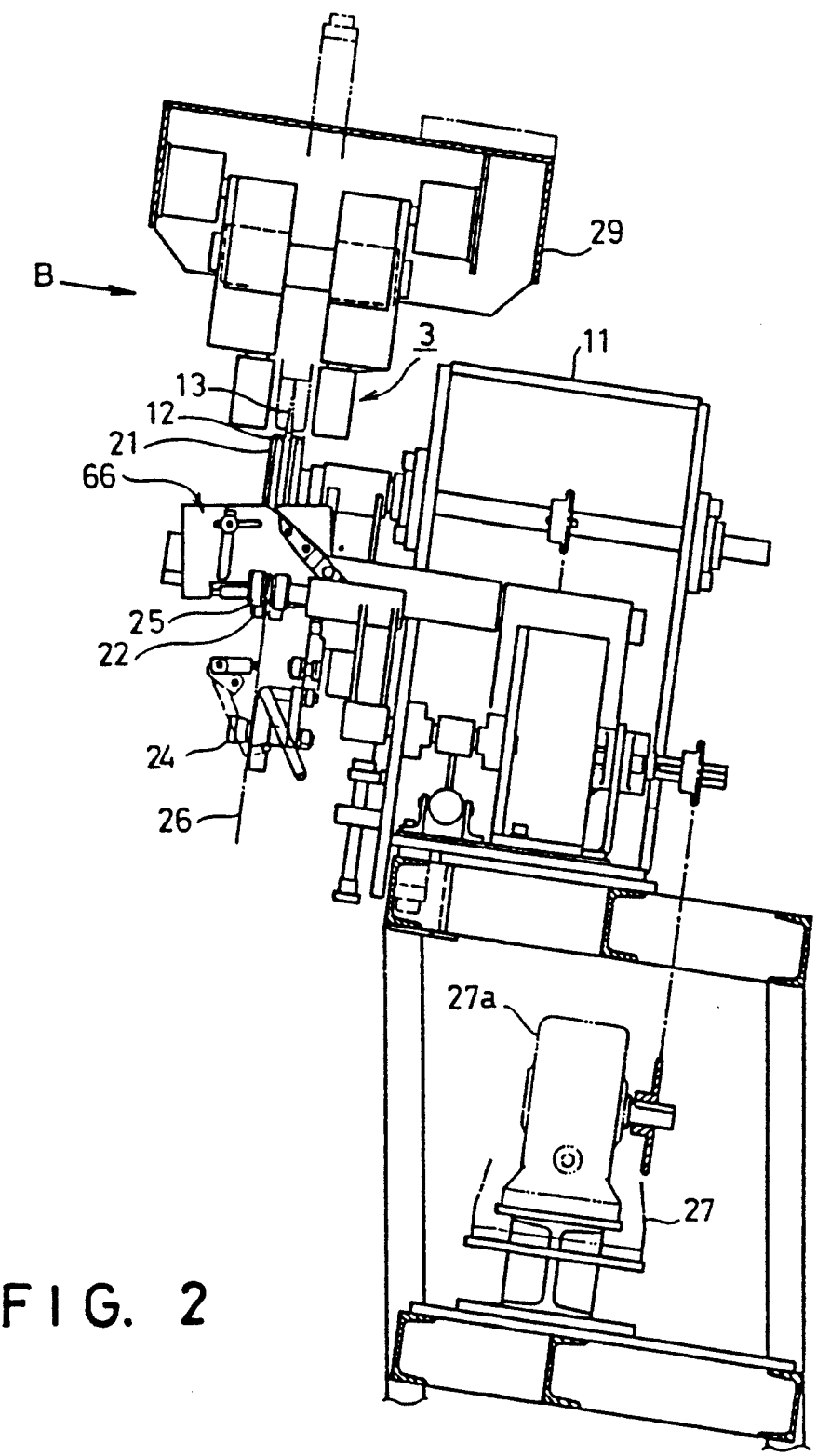
FIG. 2 is a sectional right side view of a A—A section of FIG. 1 viewed in the arrow direction.

The bead ring supporting mechanism 1 comprises first, second, third, fourth and fifth support rollers 21, 22, 23, 24 and 25 attached to a machine frame 11 and likes. As shown in FIGS. 1 and 2, each of the support rollers 21 to 25 are adapted to rotatably support a bead ring 12 in conformity with a plane 26 which is slightly slanting with respect to a vertical plane. The first support roller 21 is disposed in a predetermined upper position and the first and second support rollers 21 and 22 are adapted to be rotationally driven in counterclockwise direction in FIG. 1 by a rotationally driving motor 27 through reduction gear 27a, sprocket, chains and likes. The first to fifth support rollers 21 to 25 have a groove in their peripheries, respectively, which is adapted to engage with the inner peripheral surface of the bead ring 12. The fifth support roller 25 is rotatably pivoted and the second and fifth support rollers 22 and 25 have their support shafts supported by a swinging arm driven by a cylinder and are adapted to move to an acting position (position of FIG. 1) which contacts the inner peripheral surface of the bead ring 12 and to a retreating position which displaces inward from the acting position. The third and fourth support rollers 23 and 24 have, respectively, a groove having one of its side walls formed greater in diameter and a shaft supported rotatably and the shafts are fixed to a moving plate 23a driven by a cylinder and are adapted to move to an acting position which contacts the inner peripheral surface of the bead ring and a retreating position which displaces upward from the acting position. The acting positions of the second to fifth support rollers 22 to 25 are adapted to be respondable to variation of the bead ring diameter by changing their stop positions with respect to their movement by the cylinders.

Figure 3:
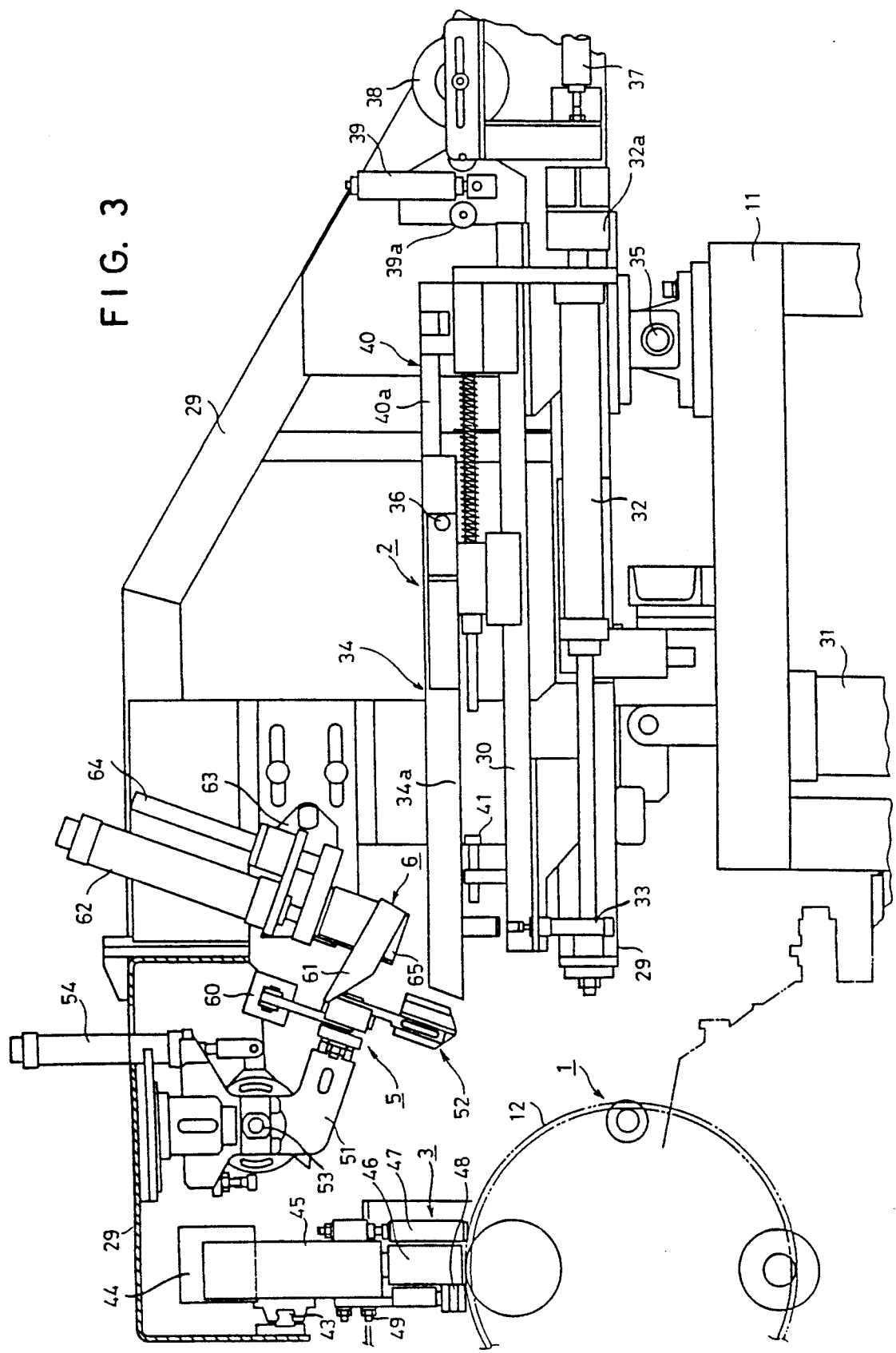
FIG. 3 is a front view showing a portion supported by a slanting frame 29.
Figure 4:
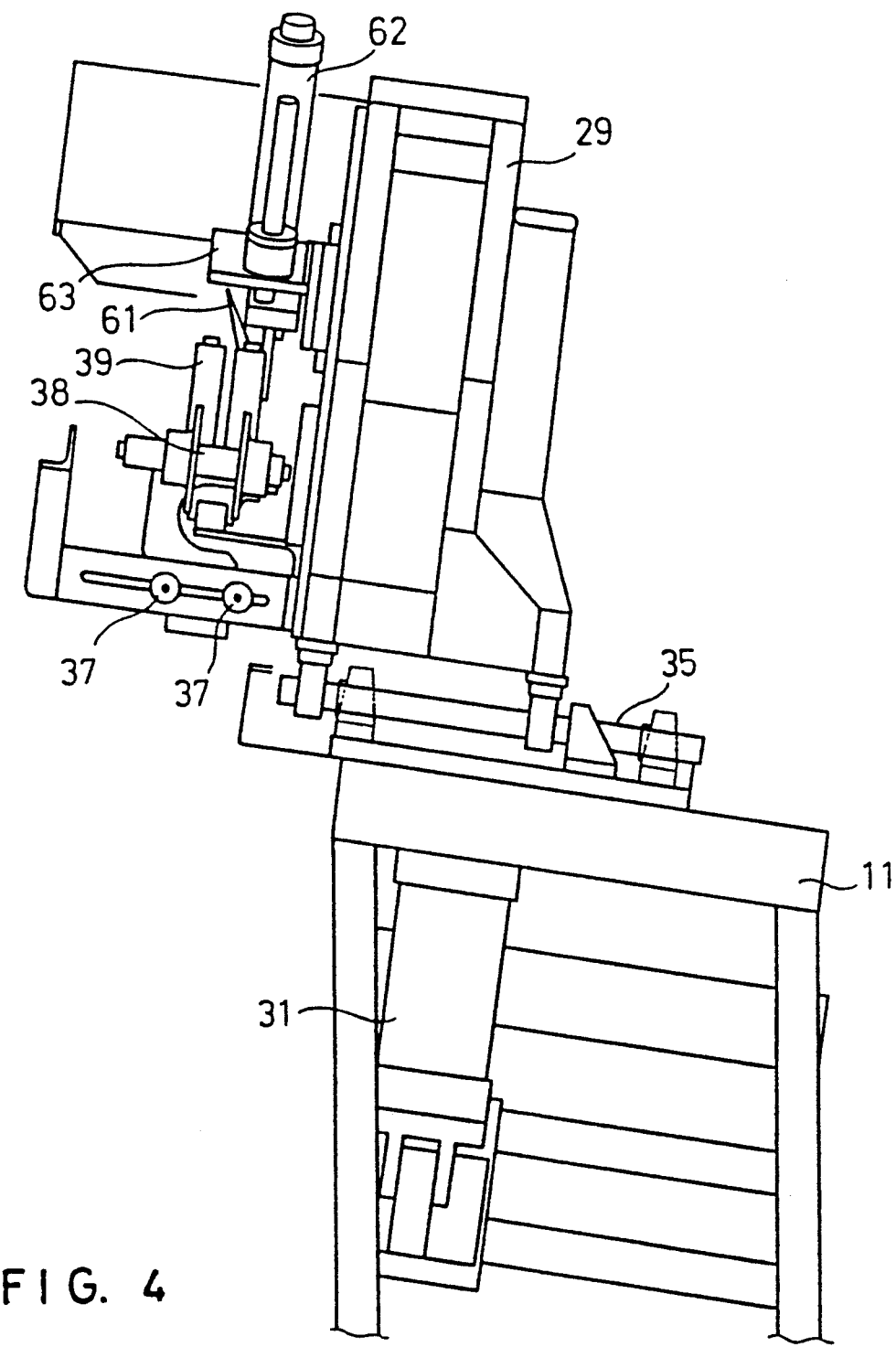
FIG. 4 is a partial right side view.
Figure 5:
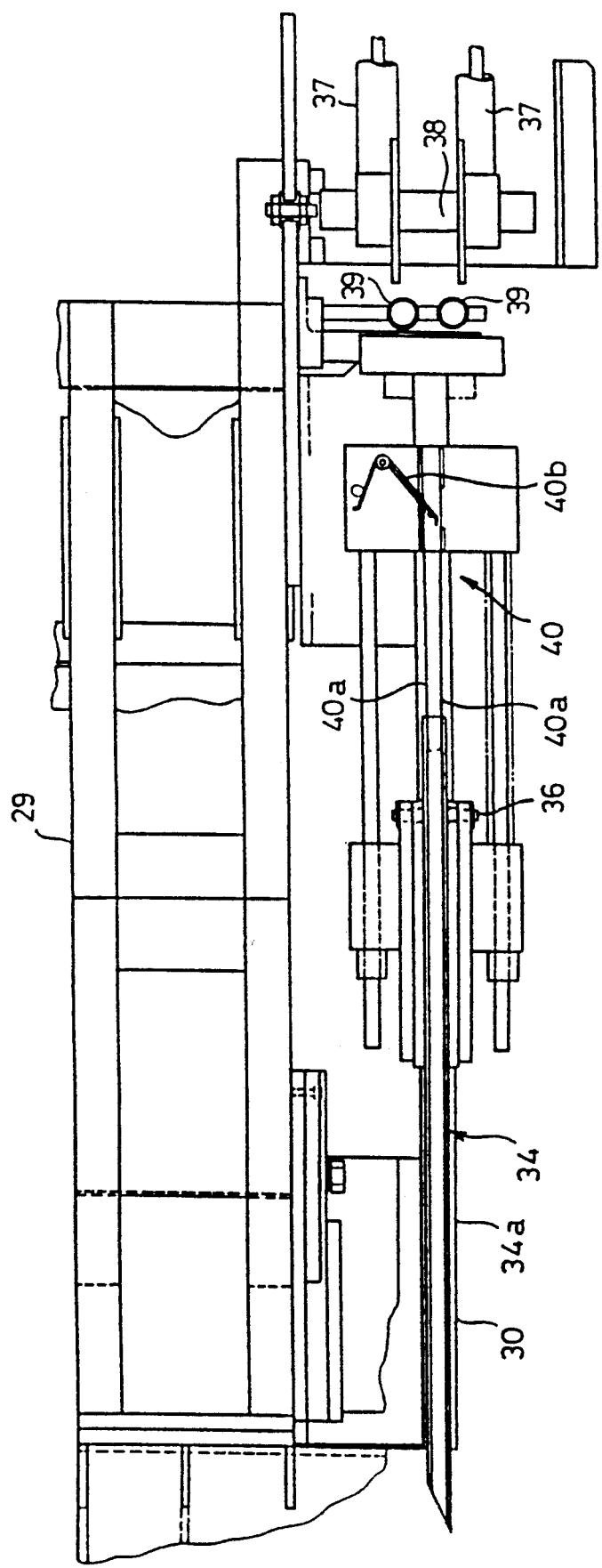
FIG. 5 is a plan view of an apex feeding mechanism 2.

As shown in FIGS. 3 and 5, the apex feeding mechanism 2 comprises a guide rail 30, cylinders 31, 32 and 33, an apex guide 34 and likes which are disposed on the slanting frame 29. The slanting frame 29 is supported on the machine frame 11 so as to be rotatable about an axle 35 and adapted to be moved up and down in a side of the bead ring supporting mechanism 1 by the cylinder 31. The guide rail 30 is fixed to the slanting frame 29 and extends in the left-to-right directions of FIG. 3. The apex guide 34 is formed of a grooved member 34a for guiding an apex 13 in an upright state from the right to the left of the drawing and adapted to be driven forward and backward by air cylinders 32 and 32a along the guide rail 30. The cylinder 32a is separately provided for driving a small distance (10 millimeters) in the same direction as the cylinder 32. The apex guide 34 can take a horizontal position where the bottom of its groove lies on a horizontal straight line which circumscribes the uppermost or top portion of the bead ring supported by the bead ring supporting mechanism 1, a position where its forepart is slightly raised about an axle 36 by the cylinder 33 separately disposed at the fore end portion of the guide rail 30 and the abovementioned position where it is driven by the cylinders 32 and 32a and, also, it can take a vertically moved position where it is revolved by the abovementioned cylinder 31 together with the slanting frame 29. Though not shown in the drawing, the apex fed in the groove of the apex guide 34 from the rightside of FIG. 3 is delivered from an apex delivering mechanism and is adapted to move upward between a pair of guide rollers 37 from the underside thereof, to be put in an upright state where it directs the tip of its triangular cross-section upwards by a double flanged guide roller 38, to pass between a pair of guide rollers 39, a bottom face support roller 39a and a detent portion 40 and to come in the groove of the member 34a. The detent portion 40 comprises a pair of leaf springs 40a arranged to guide the apex 13 therebetween and having their fore end portions in the advancing direction of the apex spaced narrower and their rear end portions fixed to a member which supports the member 34a and moves forward and backward. In the drawing, 40b denotes an apex detent urging spring. The apex 13 which is in a state of coming out of the fore end of the apex guide 34 moves forward with the apex guide 34 and comes out from the apex delivering mechanism in such a fashion in that it is pulled out therefrom when the apex guide 34 moves forward, while, when the apex guide 34 moves backward as the apex is held at its fore end portion, it allows it and moves back without pulling back the apex 13. 41 of FIG. 3 denotes a stop for confining the advancing position of the apex guide 34 driven by the cylinder 32.

Figure 6:
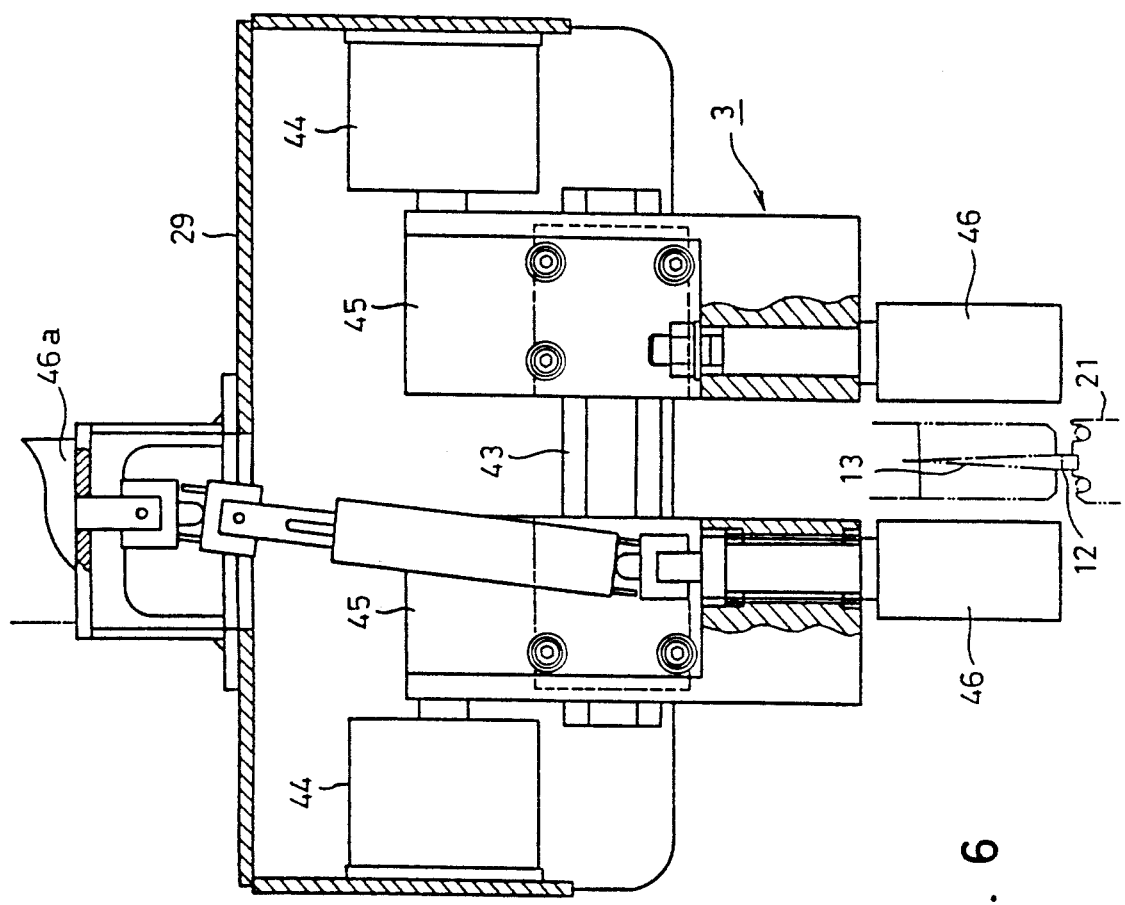
FIG. 6 is a partial sectional right side view of a pressing mechanism 3.

As shown in FIGS. 3 and 6, the pressing mechanism 3 is disposed at the fore end of the slanting frame 29 so as to come above the bead ring supporting mechanism when the slanting frame 29 is in its horizontal lowered position and provided with a pair of pressing roll support portions 45 which are movable to and from each other by a pair of air cylinders 44 along a guide rail 43 attached to the slanting frame 29. Both roll support portions 45 are provided respectively with center rollers 46, inlet rollers 47 and outlet rollers 48 which form pairs in both sides. The axes of center rollers 46 stand a little to the right of the top portion of the bead ring 12 in FIG. 3 and have an outer diameter uniform throughout the whole length and a length sufficiently greater than the height of the upright apex 13 and they are supported rotatably. The inlet rollers 47 are less in diameter than the center rollers 46 and both supported rotatably so that their height is adjustable in their axial direction. Each of the outlet rollers 48 includes three radial ball bearings supported by a shaft which is fixed to the roller support portion 45 by two bolts so that its angle can be adjustable about one of the bolts and, thus, it is adjusted in conformity with the inclination of the side face of the apex 13. The pressing mechanism 3 can be driven into a clamping action position where the rollers are moved near each other and a retreating position where they are mutually apart by the cylinders 44 and, further, into a lowered pressing action position and a raised position as shown by vertical movement of the slanting frame 29.

Though not shown in the drawings, the apex leading end detector is of photoelectric type provided for enabling detection of the leading end of the apex when it reaches a position corresponding to a predetermined angle of rotation, for example, about two third rotation while the leading end of the apex 13 is applied to the periphery of the bead ring 12 and the succeeding apex 13 is then applied with rotation of the bead ring 12. Its detection signal is used for cutting the apex 13 to a predetermined length during application and used for stopping rotation of the bead ring 12 so that the length from the leading end of the apex 13 to the cutting position by a cutter of the cutting mechanism 6 is equal to the peripheral length of the bead ring 12 plus the length of the overlap joint. In order to make the cut size correct, a pulse generator and a pulse counter corresponding to the angle of rotation of the bead ring 12 are provided for slowing down the rotation of bead ring after detection of the leading end and, at the same time, counting pulses to stop it for obtaining a desired stop position when it rotates by a predetermined number of pulses.

Figure 7:
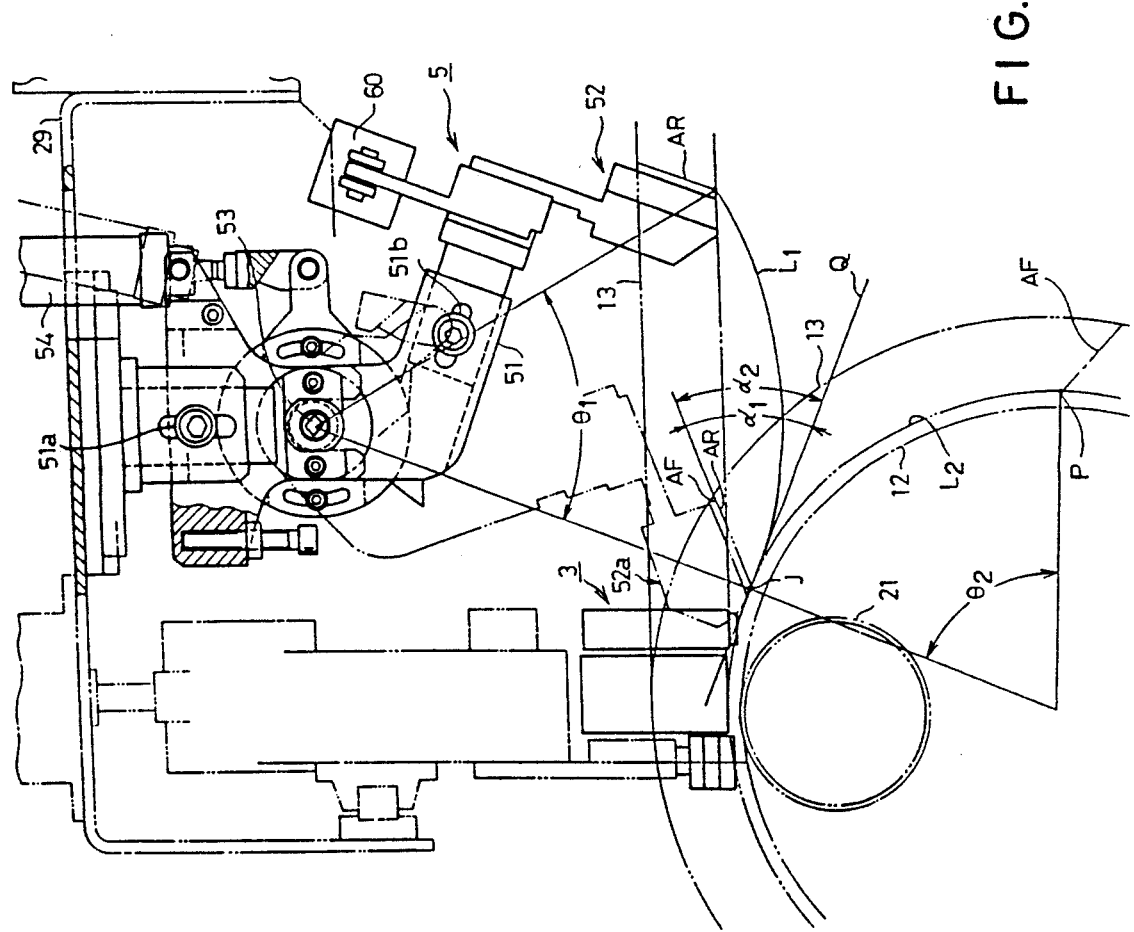
FIG. 7 is an enlarged front view showing a relationship between a chucking mechanism 5 and a bead ring 12.
Figure 8B:
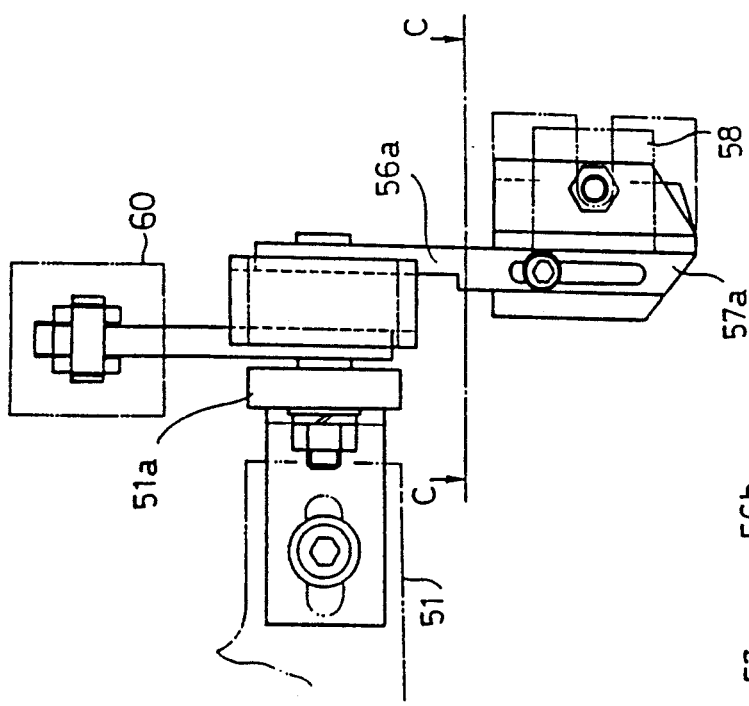
FIG. 8 shows the chucking mechanism 5 in which (a) is a enlarged right side view viewed from a direction normal to its plane of movement, (b) is a right side view of (a) and (c) is a C—C section of (b)
Figure 8C:
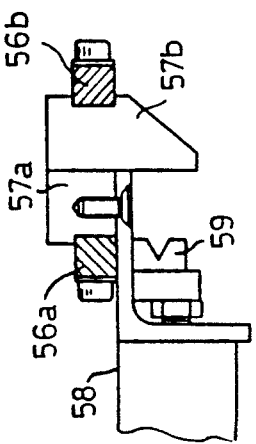
Figure 8A:
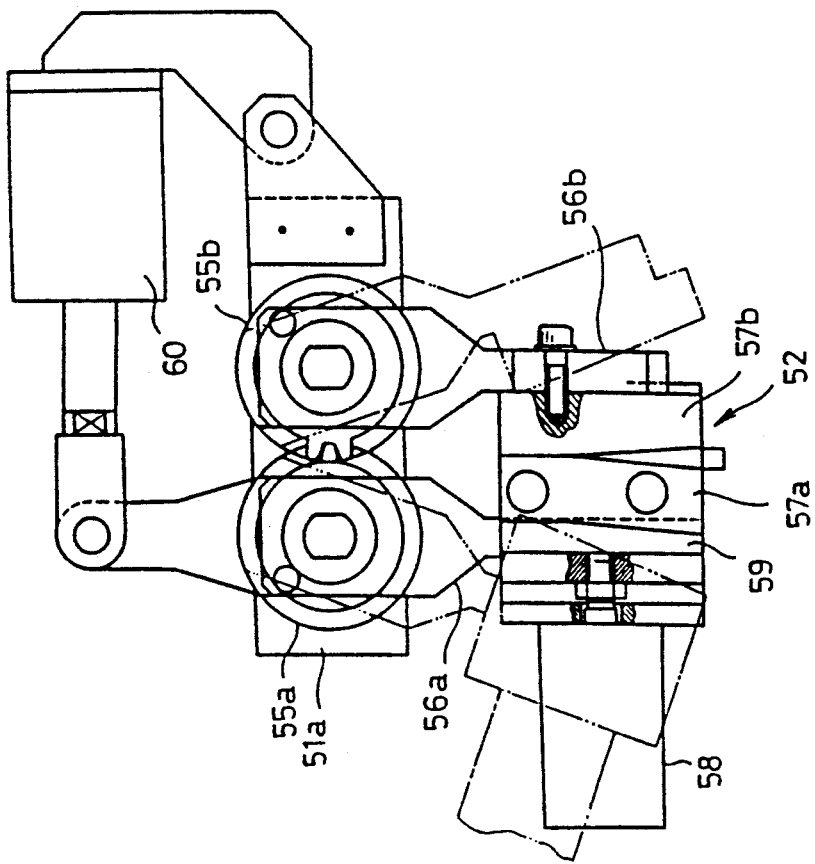

The chucking mechanism 5 is mounted on the slanting frame 29 so as to be positioned diagonally above and to the right of the bead ring supporting mechanism 1 in FIGS. 1 and 3, and is composed of a swing arm 51 pivoted on the slanting frame 29 and a chucking unit 52 mounted on the swing arm 51 as shown in FIGS. 7 and 8. The swing arm 51 is rotatably supported at its base portion by an axle 53 and provided with a base height adjuster 51a. It extends a little downward from its base portion and then rightward and downward in FIG. 7 and has an adjusting portion 51b in a midway thereof and it supports the chucking unit 52 at the top and is adapted to rotate in clockwise direction from the position as shown by a cylinder 54. The chucking unit 52 comprises two mutually meshing similar gears 55a and 55b supported, rotatably at the top end of the swing arm 51, actuating arms 56a and 56b extending from the respective gears, members 57a and 57b attached respectively to the top ends of the actuating arms 56 and 56b for contacting the side faces of the apex 13, another member 59 which is movable forward and backward by a cylinder 58 attached to the member 57a as facing part of the member 57b, and actuating drive cylinder 60 disposed between an arm 56a attached to the gear 55a and the swing arm 51. The chucking unit 52 is so arranged in such a manner as to enable forward and backward movement of the apex guide 34 between the members 57a and 57b and the member 59 when they are mutually open (or apart) in the position of FIGS. 3 and 7. When the apex guide 34 moves backward after the apex 13 is pulled out to the pressing mechanism 3, and apex 13 reaches between the fore end of the apex guide 34 which moved backward and the rollers of the pressing mechanism 3, the apex 13 is clamped between the members 57a and 57b and the member 59 if they are closed by the cylinders 60 and 58. The chucking unit 52 is so arranged also as to reach a joint acting position 52a, as shown in FIG. 7, which is near the top portion of the bead ring 12 supported by the bead ring supporting mechanism 1 when it is revolved from its clamping position as shown by the cylinder 54. After formation of the joint at this position, the cylinder 58 is actuated to press the joint portion against the member 57b.

The apex cutting mechanism 6 is mounted on the slanting frame 29 so that, when the slanting frame 29 is in its lowered (horizontal) position, a cutter 61 effects a downward cutting action between the fore end of the apex guide 34 in its retreating position in the apex feeding mechanism 2 and the chucking unit 52 in its clamping position. In the drawings, 62 denotes a cutter driving cylinder, 63 denotes a cylinder support member, 64 denotes a guide and 65 denotes a cutter mounting member. Mounting position and angle of the cylinder support member 63 with respect to the slanting frame 29 and a cutter mounting position of the cutter mounting member 65 are made adjustable individually.

Figure 9A:
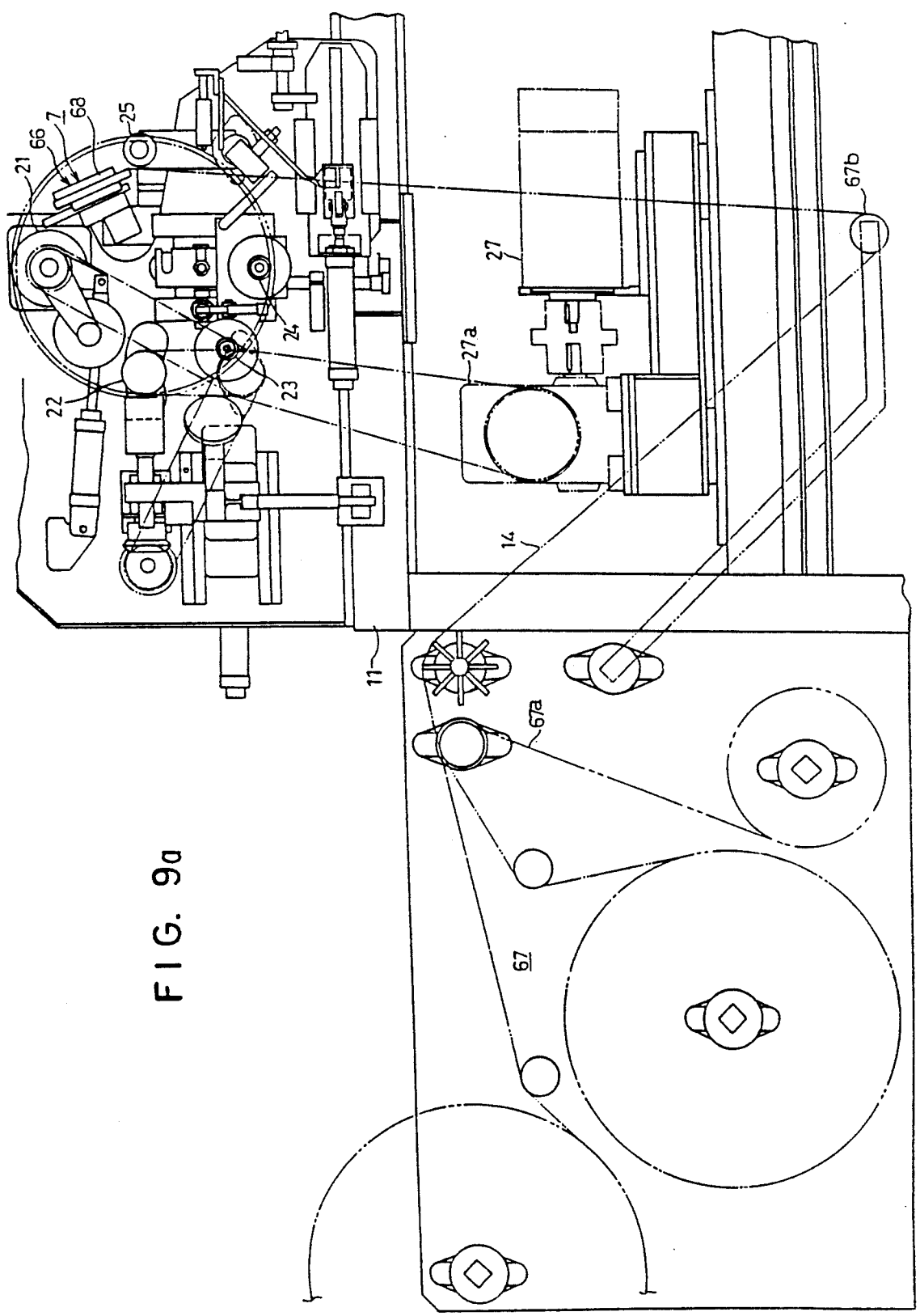
FIG. 9(a) is a front view showing a structure of a bead filler feeding and guiding mechanism 7.

As shown in FIGS. 1 and 9(a), the filler feeding and guiding mechanism 7 comprises a pressing and cutting unit 66 disposed in a diagonally right downward position relative to the first support roller 21 and a filler feeding unit 67 for feeding a filler thereto.

Figure 9B:
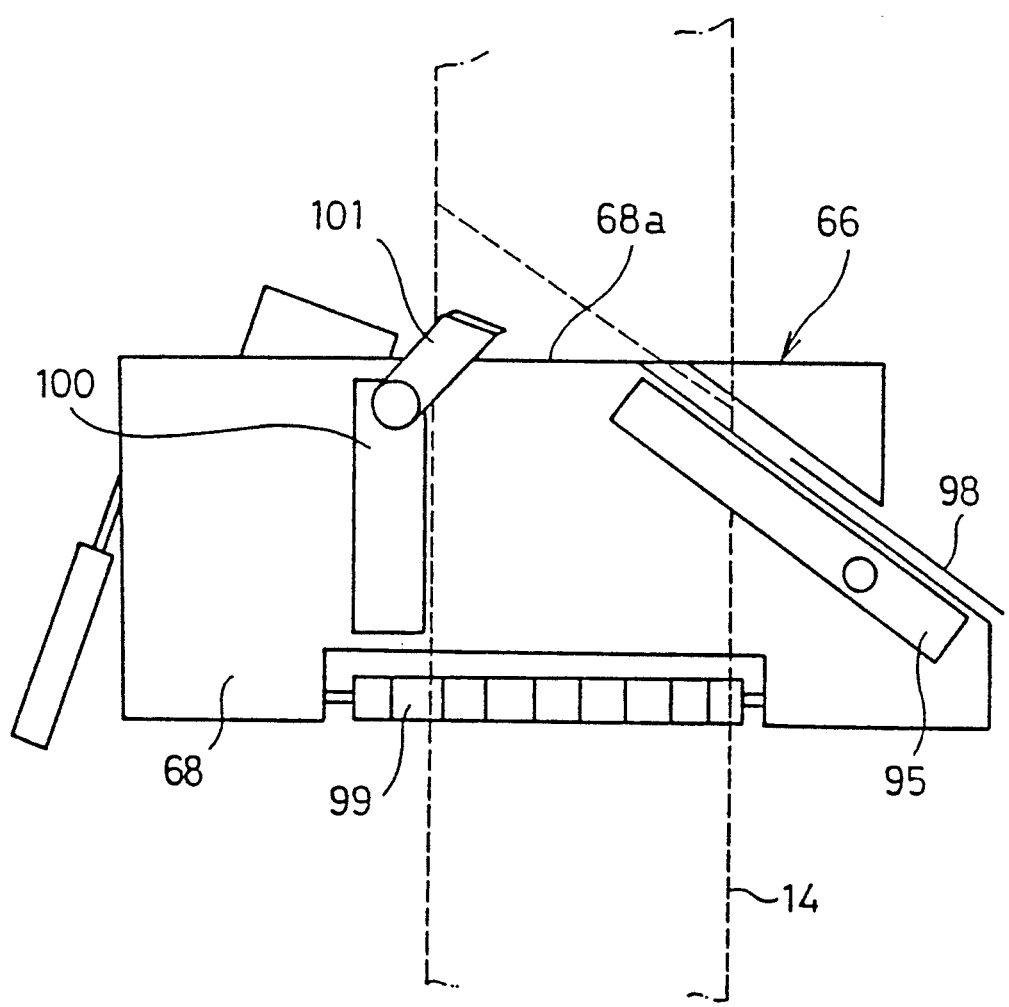
FIG. 9(b) is a schematic view of a moving plate portion of a pressing and cutting portion 66 viewed from the side of a filler supporting surface.

As shown in FIG. 9(b), the pressing and cutting unit 66 includes a movable plate 68 provided with a cramping plate 95, a filler guide 100, a cutter 98, an abacus roller 99, a slide plate 101 and likes. The cramping plate 95 can be moved in the direction normal to the upper surface of the movable plate 68 by a cylinder to cramp and release the leading end portion of the filler to and from the movable plate 68 and the cutter 98 is adapted to move diagonally with respect to the upper edge 68a of the movable plate 68 in the vicinity of the upper edge. The movable plate 68 itself is adapted to be moved vertically by a cylinder between a lower retreating position as shown in FIG. 9(a) and an upper pressing position in which its upper edge contacts a portion of the inner peripheral surface of the bead ring 12 which is close to the first support roller 21. The pressing and cutting unit 66 moves from the lower retreating position to the upper pressing position in a state wherein the bead filler 14 is cramped to the movable plate 68 by the cramping plate 95 so that the leading end of the filler 14 extends a little from the upper edge 68a of the movable plate 68, presses the leading end portion of the bead filler 14 to the inner peripheral portion of the bead ring 12 to join thereto and, after joining, releases the cramping plate 95 to allow the filler 14 to be drawn out with rotation of the bead ring 12. Then, the movable plate 68 returns to its original lower retreating position. The bead filler 14 which is drawn out thereafter with rotation of the bead ring 12 and wound on the bead ring 12 is cut to length by the cutter 98 while the rear end thereof is cramped by the cramping plate 95 and the movable plate 68 stands by in the lower retreating position as cramping the leading end portion of the filler 14 which is newly formed by cutting. The filler feeding unit 67 which is provided for guiding and feeding the filler to the pressing and cutting unit 66 pays out the filler 14 while winding up a liner separately and guides it through a guide roll 67b to the pressing and cutting unit 66, as shown in FIG. 9.

Figure 10:
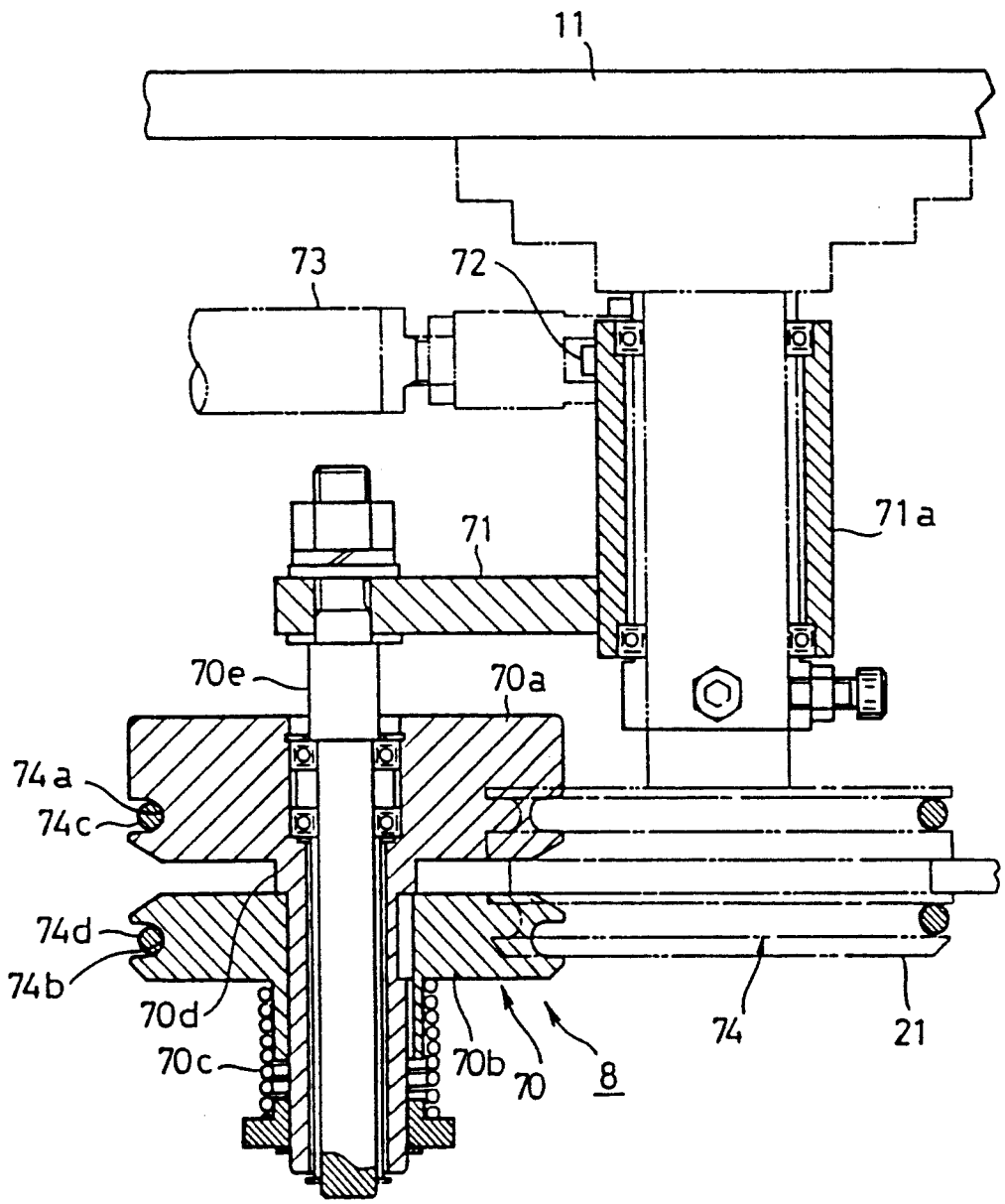
FIG. 10 is a enlarged partial sectional view of a bead filler winding up mechanism 8.

As shown in FIGS. 1 and 10, the filler winding or folding mechanism 8 is disposed at a position between the first support roller 21 and the second support roller 22 and comprises a winding roller 70, a support arm 71, a driving arm 72, a driving cylinder 73 and a rotation transmitting unit 74. As shown in FIG. 10, the winding roller 70 is composed of roller members 70a and 70b axially urged to form therebetween a groove 70d having a width corresponding to the width of the bead ring 12, and rotatably supported by an axle 70e which is fixed to the top of the support arm 71. The support arm 71 has a base end portion fixed to a tubular member 71a rotatably fit on a part of an axle of the support roller 21. The base end of the driving arm 72 is fixed to the tubular member 71a and a driving cylinder 73 is disposed between the top of the driving arm 72 and the machine frame 11. With this arrangement, the winding roller 70 is moved from its retreating position as shown in FIG. 1 to its winding operation position by shrinking action of the driving cylinder 73 to allow the bead ring 12 to pass within the groove 70d. The peripheral grooves 74a and 74b of the roller members 70a and 70b are provided for forming the rotation transmitting unit 74 for transmitting rotation of the first support roller 21 by hanging O rings 74c and 74d between them and similar grooves formed in the periphery of the first support roller 21.

Figure 11:
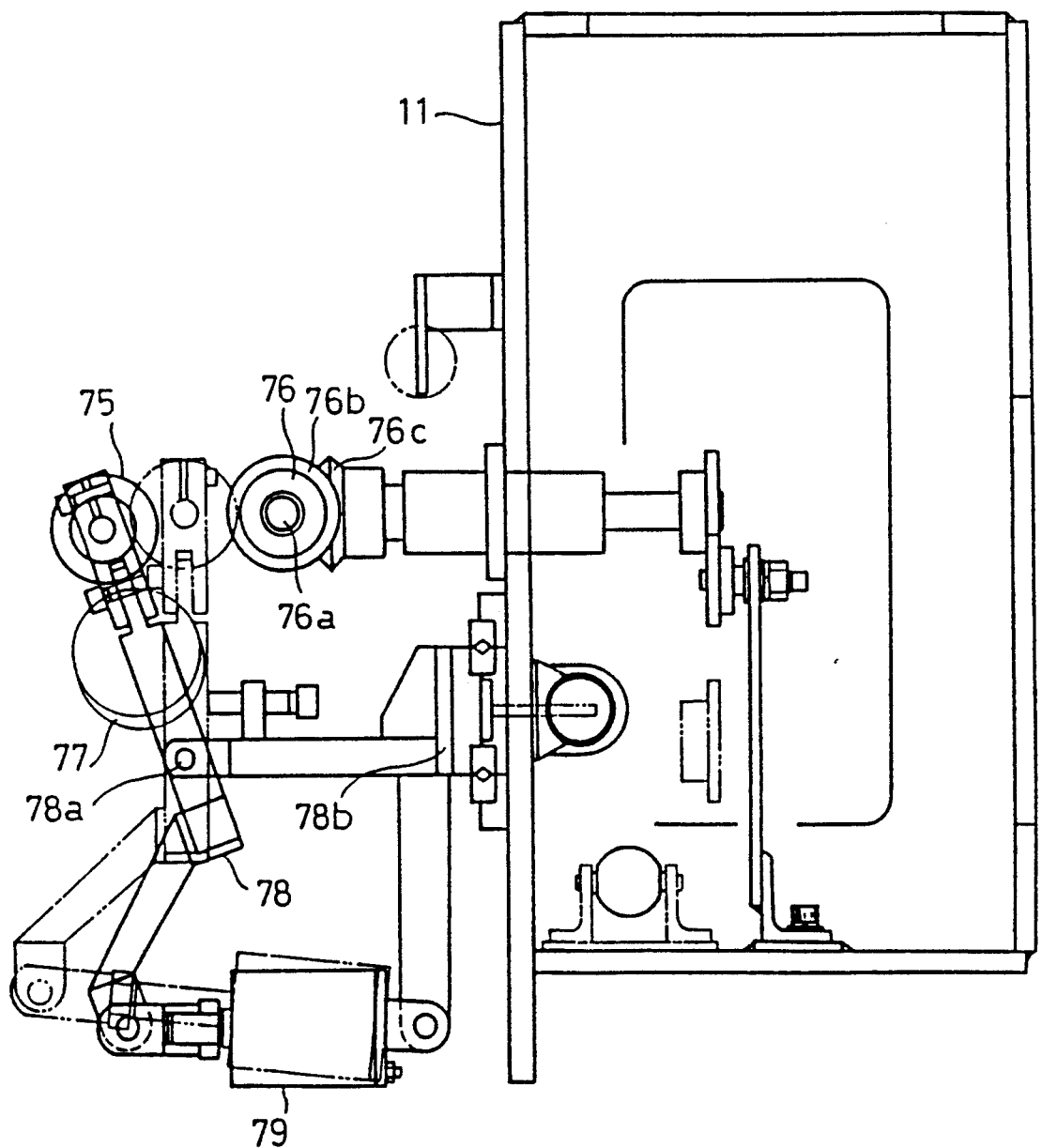
FIG. 11 is a right side view of a press roll mechanism 9.
Figure 12:
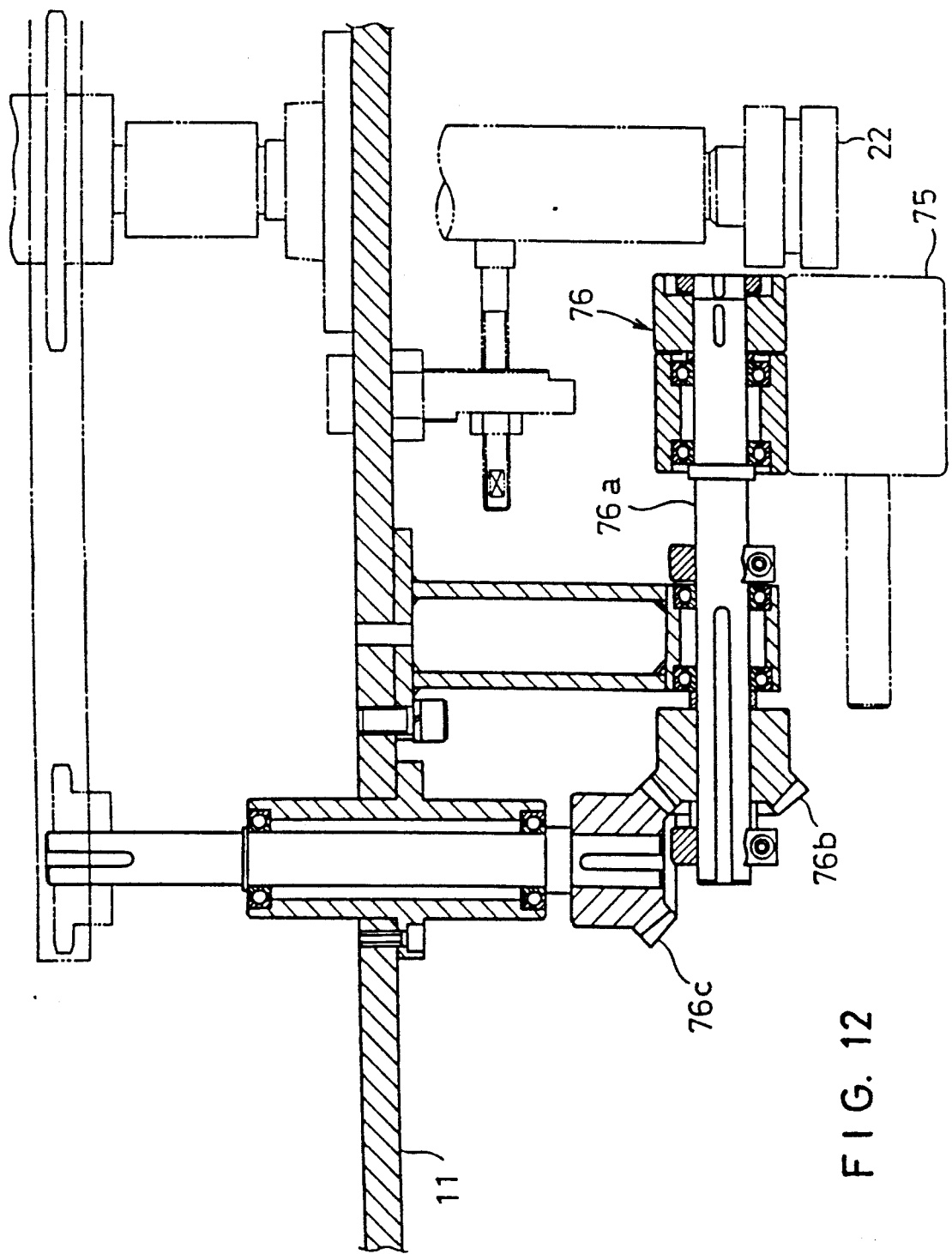
FIG. 12 is a cross sectional plan view of the press roll mechanism 9, FIGS. 13(a) and (b) are sectional views showing states where the apex and bead filler are applied to the bead ring.

As shown in FIGS. 1 and 11, the press roll mechanism 9 is disposed to the left side of the second support roller 22 for pressing the wound or folded filler 14 from both sides to sufficiently join with the apex 13 and composed of a pair of facing rollers 75 and 76, an independent roller 77, a roller support arm 78 and a driving cylinder 79. As shown in FIGS. 11 and 12, the rollers 75 and 77 are supported by the roller support arm 78 and are individually rotatable. The roller support arm 78 can swing about an axle 78a in the side of the machine frame 11 and the cylinder 79 is disposed between its lower end and the machine frame 11. As shown in FIG. 11, the rollers 75 and 77 are moved by an action of the cylinder 79 between its retreating position as shown by a solid line and a press action position as shown in phantom. The roller 76 is disposed in parallel to the roller 75 in a position when it pinches the wound filler and adapted to be rotationally driven. In the drawing, 76a denotes a roller supporting shaft and 76b and 76c denote driving bevel gears. A support member 78b of the rollers 75 and 77 and the shaft 76a of the roller 76 of this press roll mechanism 9 can be moved for adjustment in the horizontal direction in the left-to-right direction in FIG. 1.

The guide roller mechanism 10 provides a guide action to the apex 13 or the apex 13 with filler 14 applied successively to the bead ring 12 supported by the bead ring supporting mechanism 1 and comprises guide rollers 81 and 82 disposed substantially between the fourth support roller 24 and the fifth support roller 25, a support arm 83 for supporting these rollers, a guide rail 84 and a cylinder 85. The guide roller 81 and 82 are positioned so as to contact the apex 13 or the apex 13 with filler 14 respectively from the front side and the opposing rear side of FIG. 1 and are rotatable and their support arms 81a and 82a are supported by the support arm 83. The support arm 83 is provided with a slide member 83a at its lower base portion which is movable along the guide rail 84 in the left-to-right direction in FIG. 1. The guide rail 84 is fixed to the machine frame 11. The cylinder 85 is disposed under the guide roller 24 and adapted to move the guide rollers 81 and 82 between a guide action position as shown and a rightward retreating position. In the drawing, 86 denotes a guide rod disposed in the same side as the guide roller 82 and fixed to the movable plate 23a which supports the abovementioned third and fourth support rollers 23 and 24 moves with the third and fourth support rollers 23 and 24 to its acting position and retreating position.

In addition, a pushing mechanism 90 and a holding mechanism 91 are provided for taking out the bead assembly from the applying device after applying the apex 13 only or the apex 13 with filler 14 to the bead ring 12. The pushing mechanism 90 is composed of a pusher plate and a cylinder for pushing the upper portion of the completed bead assembly to the front side in FIG. 1. The holding mechanism 91 comprises a cylinder 92 and a lever like holding member 93 attached to the abovementioned movable plate 23a and the holding member 93 is pivoted by an axle 93a and acts to push in the lower portion of the bead assembly from the front side to the back side in FIG. 1 to hold the bead assembly at a point in its lower position. When the pushing mechanism 90 and the holding mechanism 91 are actuated concurrently after the second and fifth support rollers 22 and 25 retard, the bead assembly rotates about its lower portion into a slanting state so that the upper portion of the bead assembly butts against a stop bar extending from the bead feeding device not shown and, at the same time, the holding member 93 is actuated by the cylinder 92 to release holding of the bead assembly to allow the assembly to fall with its own weight in the slanting state to be received by a lower stock arm for storage.

The apex applying device constructed as above operates as follows by means of sequence control.

(1) The apex feeding mechanism 2, pressing mechanism 3, chucking mechanism 5 and apex cutting mechanism 6 are in their stand-by position in which the slanting frame 29 is raised its left side by the cylinder 31 to swing about the axle 35.

(2) At this time, the belt-shaped apex 13 is taken out from the apex feeding mechanism and its leading end portion is drawn out in a standing state to the fore end of the apex guide 34 of the apex feeding mechanism 2. The second to fifth support rollers 22 to 25 of the bead ring supporting mechanism 1 for supporting the bead ring 12 are put in their retreating position which is more inside than their acting position for supporting the bead ring 12 by operation of the respective cylinders. The leading end of the belt-shaped filler 14 is drawn out to the upper edge 68a of the movable plate 68 of the pressing and cutting unit 66 of the filler feeding and guiding mechanism 7 and the movable plate 68 cramps the leading end portion of the filler by the cramping plate 95 and is in its retreating position. Moreover, the pushing mechanism 90 and the holding mechanism 91 are also in their retreating positions.

(3) From such stand-by state, the bead ring 12 is fed to the bead ring supporting mechanism 1 and mounted in the groove of the first support roller 21 thereof. This is effected by an automatic mounting device for the bead ring supporting mechanism 1 or manual operation. The bead ring 12 is put in contact with the first support roller 21, the lower guide rod 86 and the inner side surfaces of the large diameter portions of the third and fourth support rollers 23 and 24 and supported slightly slanting with respect to the vertical plane to become stable.

(4) In this supported state, the second to fifth support rollers 22 to 25 move from their retreating positions to the acting positions to support the bead ring 12 in a state in which the bottoms of their grooves are in contact therewith.

(5) In substantial synchronism with (4), the apex guide 34 moves forward with the contracting operation of the cylinder 32 and the leading end portion of the apex 13 in its standing state is drawn out between the pair of central rollers 46 of the pressing mechanism 3. Succeedingly, the rollers 46, 47 and 48 come in the mutually closing cramp position with the operation of the cylinder 44 to cramp the leading end portion of the apex 13. Thereafter, the apex guide 34 moves backward (c.f., FIG. 15(a)).

Figure 15A:
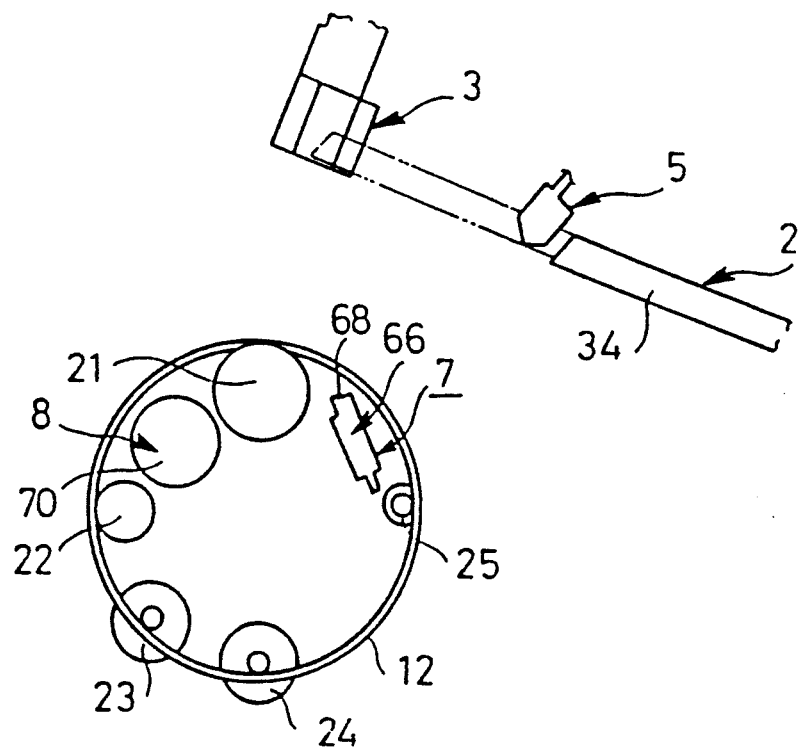
FIGS. 15(a) to 15(f) are schematic front views of various states for illustrating operation of the device of the embodiment.
Figure 15B:
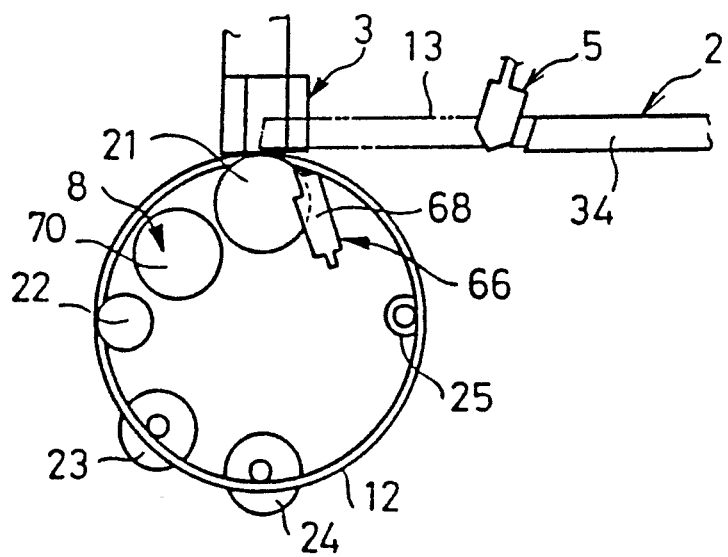
Figure 15C:
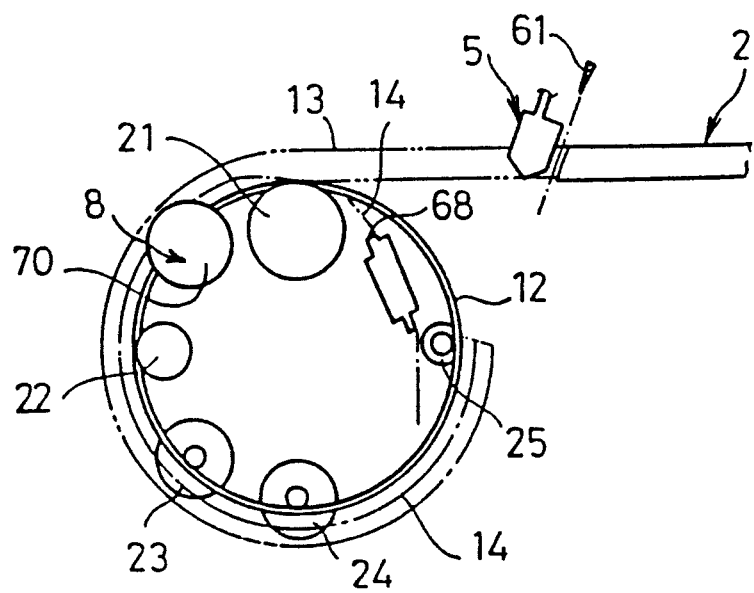
Figure 15D:
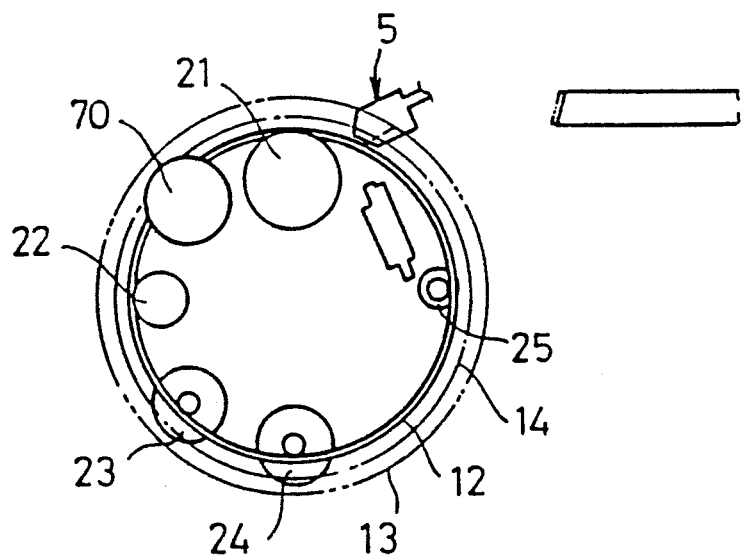

(6) After (4), the moving plate 68 of the filler feeding and guiding mechanism 7 rises to its pressing position (c.f., FIG. 15(b)) to press and joint the leading end portion of the filler 14 to a part of the inner peripheral surface of the bead ring 12 at a position a little deflecting from the center of the filler as shown in FIG. 13(a). Upon completion of the jointing operation, the pressing plate 95 rises and the moving plate 68 lowers.

(7) Succeedingly, the slanting frame 29 which has been in its raised slanting position rotationally swings down with the operation of the cylinder 31 and, accordingly, the pressing mechanism 3 lowers as cramping the leading end portion of the apex 13, thereby pressing the bead ring jointing surface of the leading end portion of the apex 13 against the top portion of the outer periphery of the bead ring 12 supported by the bead ring supporting mechanism 1 (c.f., FIG. 15(b)).

(8) Next, the first support roller 21, the winding roller 70, and the roller 76 of the press roll mechanism 9 commence rotation with rotation of the motor 27 and the bead ring 12 rotates at a high speed, thereby the apex 13 is successively applied to its outer peripheral surface in the standing state and, at the same time, the filler 14 is successively applied to its inner peripheral surface.

(9) As soon as the motor 27 commences rotation, the winding roller 70 swings to its winding action position about the axle of the first support roller 21 with the operation of the driving cylinder 73 to wind up and apply the coming filler 14 successively from its leading end portion around the bead ring 12 and against the sides of the apex 13. As shown in FIGS. 13(a) and (b), this winding operation changes the state of (a) wherein the filler 14 is applied only to the lower surface of the assembly of the bead ring 12 and the apex 13 jointed to its outer peripheral surface 12a into the state of (b) wherein it is also applied to both side faces thereof.

(10) When the leading end portion of the apex 13 applied to the rotating bead ring 12 approaches a predetermined angle (an angle of rotation at which the length of the apex from its leading end portion to the position to be cut by the cutter 61 is equal to the outer peripheral length of the bead ring 12 plus the length of the overlap joint), the apex leading end detector detects it, thereby decelerating the rotation of the bead ring 12 to stop rotation after a fixed number of pulses. This stop position is the abovementioned position of the predetermined angle (c.f., FIG. 15(c)).

(11) The member 34a of the apex guide 34 is rotated about the axle 36 by the operation of the cylinder 33 to raise its head end by a small distance (e.g., 5 millimeters), thereby raising the cramped position of the apex 13. Its purpose is to avoid mutual widthwise displacement between the cut leading and rear end portions of the apex when both end portions are jointed succeedingly.

(12) The chucking unit 52 of the chucking mechanism 5 is closed by the operation of the cylinder 60 from its open state to cramp the apex 13 in the vicinity of the fore end portion of the apex guide 34. The member 59 is then in its retreating position (c.f., FIG. 15(c)).

(13) The cutter 61 of the apex cutting mechanism 6 moves forward with the operation of the cylinder 62 and cuts the apex 13. It is cut, as shown in FIGS. 14(a), (b) and (c), obliquely with respect to its longitudinal direction in the plan view (a) of the apex 13 so that its back surface is normal to the longitudinal direction in the front view (b) (c.f., FIG. 15(c)).

(14) After forward movement of the cutter 61, the apex guide 34 is a little drawn back by the operation of the cylinder 32a. Its purpose is to avoid the cutter 61 from being caught by the next leading end portion formed by cutting the belt like apex 13 at the time of backward movement of cutter 61. Succeedingly, the cutter 61 moves backward with the operation of the cylinder 62.

(15) The rotation of the bead ring 12 is resumed. At the same time, the chucking unit 52 of the chucking mechanism 5 swings to the bead ring side about the axle 53 while cramping the rear end of the apex 13, and the rotation of bead ring 12 is decelerated after a lapse of preset pulses to stop rotation at a predetermined angular position. At this time, the rear end portion of the apex 13 cut to length is applied to the bead ring 12 and, at the same time, its rear end face and the end face of its leading end portion which has already been applied to the bead ring 12 butt against each other to form a joint.

(16) Succeedingly, the member 59 of the chucking unit 52 moves forward toward the member 57b with the operation of the cylinder 58 and urges the joint against the member 57b.

(17) In the meantime, the member 59 moves backward with the operation of the cylinder 58 and the chucking unit 52 opens succeedingly with the operation of the cylinder 60 and then swings with the operation of the cylinder 54 back to its original retreating position.

(18) After the bead ring 12 rotates and stops after a predetermined number of pulses and the pressing plate 95 of the pressing and cutting unit 66 of the filler feeding and guiding mechanism 7 presses the filler 14, the cutter 98 effects a cutting action to cut the rear portion of the filler 14 at a fixed length (the inner peripheral length of the bead ring 12 plus the overlap joint length) position.

Figure 15E:
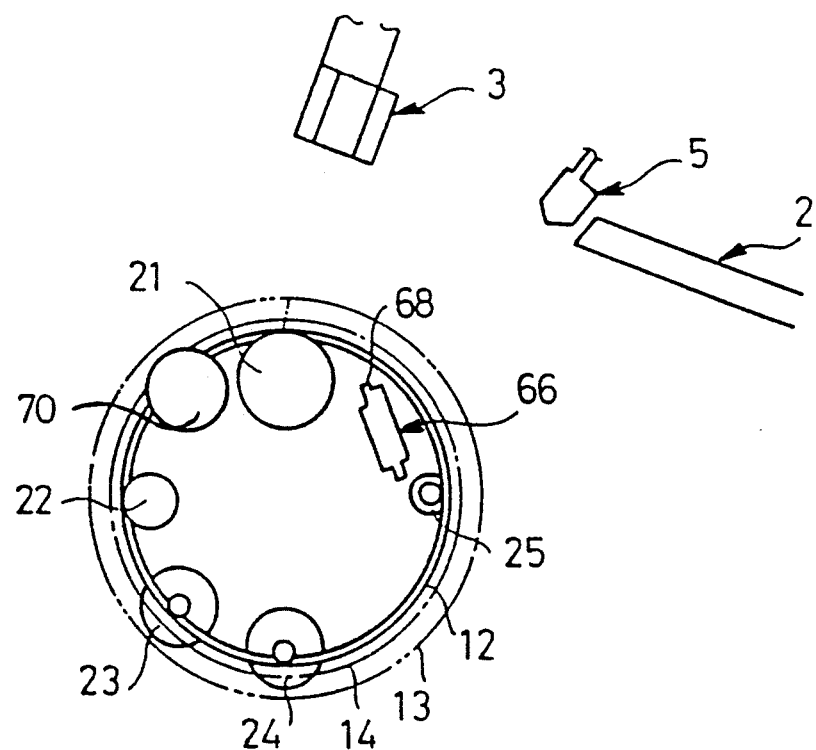
Figure 15F:
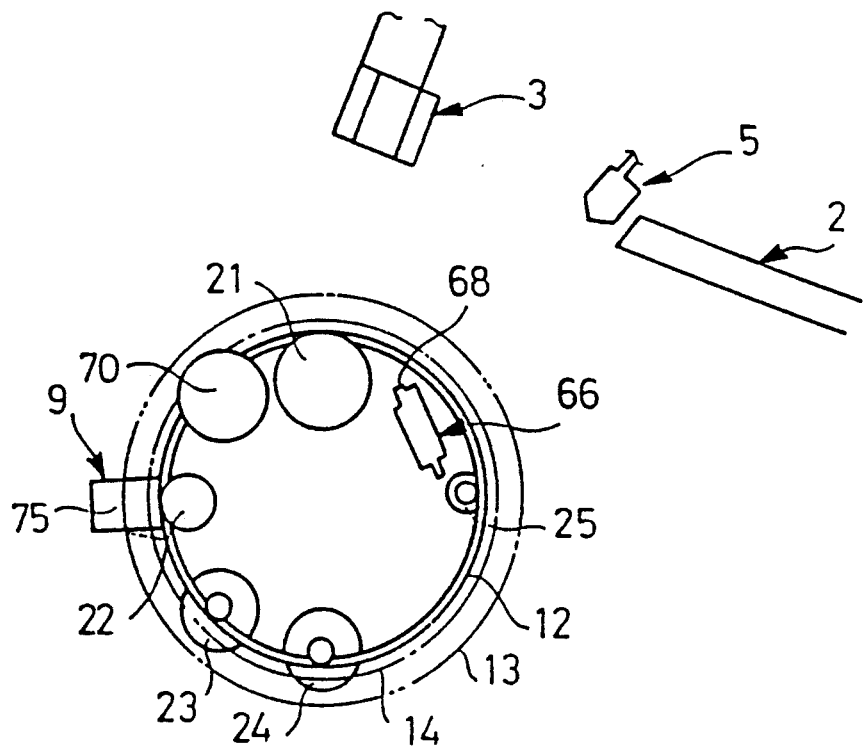

(19) After the filler cutting operation, the bead ring 12 resumes rotation and it rotates by a predetermined number of pulses to completely wind up the filler 14 around the bead ring with the apex and then stops after passing the press roll mechanism 9 (FIG. 15(f)).

(20) A predetermined time after the filler 14 is cut, the slanting frame 29 swings upward about the axle 35 with the operation of the cylinder 31 to return to its original slanting retreating position (FIG. 15(e)).

(21) The second to fifth rollers 22 to 25 and the winding roller 70 return to their original retreating positions with the respective cylinders.

(22) At the same time, the holding member 93 of the holding mechanism 91 holds the lower portion of the bead ring structure including the apex 13 and filler 14 applied to the bead ring 12 and, then, the pushing mechanism 90 pushes the upper portion of the bead ring structure. When the bead ring structure thus falls against the stop bar of the bead feeding device, the holding member 93 releases the lower portion of the bead ring structure to render it to fall with its own weight as it slants, and to be received by the lower stock arm for storage.

While the above embodiment is described about a case wherein the apex 13 is applied to the bead ring 12 and the filler is also applied thereto and wound up, only the apex 13 may be applied to the bead ring if desired and, if so, the device may be constructed as removing the parts relating to the filler 14 or the device of the embodiment may be used in such structure in that the parts relating to the filler 14 are stopped in their retarding positions to inhibit their operation.

INDUSTRIAL UTILIZABILITY

The bead apex applying method and device of this invention are utilized in the process of applying the apex to the outer peripheral surface of the bead ring prior to assembling the bead portion or the process of applying the apex and also the belt-shaped filler to the outer peripheral surface of the bead ring, in manufacture of an air-filled tire for automobile.

We claim:

1. A bead apex applying method comprising the steps of:

supporting a bead ring by an inner peripheral surface thereof for circumferential rotation, feeding a leading end portion of the apex and pressing said apex against an outer peripheral surface of said bead ring in order to support said apex substantially along a tangent of a periphery of said bead ring, rotating said bead ring circumferentially in order to successively apply portions of said apex following said leading end portion to said bead ring with said rotating, stopping said rotating of said bead ring at a predetermined angular position of said rotating and applying, clamping a trailing portion of said apex and cutting said apex to a predetermined length, resuming rotation of said bead ring and swinging said trailing end portion along an arc toward said bead ring, while maintaining said clamping, and performing said applying in synchronism with said rotating so as to bring a trailing end surface of said apex in conformity with and against a leading end surface thereof to form a butt joint.

2. A bead apex applying method comprising the steps of:
supporting a bead ring by an inner peripheral surface thereof for circumferential rotation, feeding a leading end portion of the apex and pressing said apex against an outer peripheral surface of a particular portion of said bead ring in order to support said apex leading end portion substantially along a tangent of a periphery of said bead ring, feeding applying, and pressing a leading end portion of a belt shaped bead filler to an inner peripheral surface of said particular portion of said bead ring, rotating said bead ring circumferentially in order to successively apply said apex and said filler to said bead ring and while folding said filler around said bead ring and into contact with said apex during said rotating, stopping said rotating of said bead ring at a predetermined angular position, clamping a trailing portion of said apex and cutting said apex to a predetermined length, resuming rotation of said bead ring and swinging said trailing end portion along an arc toward said bead ring, while maintaining said clamping, and performing said applying in synchronism with said rotating so as to bring a trailing end surface of said apex in conformity with and against a leading end surface thereof to form a butt joint and, after forming the joint, again stopping said rotating of said bead ring and cutting said filler to length, and the rerotating said bead ring so as to complete the filler applying and folding.

3. An apex applying device having means for supporting said bead ring and a rotational driving means for rotating said bead ring circumferentially, apex feeding means for feeding an apex to said bead ring supporting means, means for handing a leading end portion of said apex over to a means for pressing said apex against an outer peripheral surface of a particular portion of said bead ring, said bead ring rotational driving means rotating said bead ring in order to successively apply said apex to said bead ring, means for cutting said apex to a predetermined length, and means for applying said predetermined length of apex to said bead ring, and further comprising:
means for moving a fore end portion of said apex feeding means to and from a vicinity of said particular portion of said bead ring at which said leading end portion of said apex is handed over to said pressing means,
a chucking means for clamping a trailing end portion of the apex, said chucking means being swingable along a circular arc between a position adjacent said fore end portion of said apex feeding means, when said apex feeding mechanism is in a retreating position, and a joint position to which said leading end portion of said apex moves with said bead ring during said rotating of said bead ring so as to bring a trailing end surface of said apex in conformity with and against a leading end surface thereof to form a butt joint of said apex, and
an apex cutting position of said cutting means being disposed between situation of said fore end portion of said apex feeding means in said retreating position and situation of said chucking means adjacent said fore end portion of said apex feeding means.

4. An apex applying device as set forth in claim 3, and further comprising:
said bead ring supporting means having a driving roller and a tension roller which are put in contact with the inner peripheral surface of the bead ring,
a filler feeding means for feeding a filler to said inner peripheral surface near said particular portion of said bead ring, said filler feeding means comprising a cutting unit by which said filler is cut to a predetermined length,
a means for folding said filler about said bead ring and into engagement with said apex, said folding means being disposed in a position apart from said filler feeding mechanism in the direction of rotation of said bead ring,
whereby said apex is applied to the outer peripheral surface of said bead ring and, at the same time, said filler is applied to the inner peripheral surface of said bead ring and also folded up around the bead ring and the apex.

5. An apex applying device having a bead ring supporting means for supporting said bead ring, said bead ring supporting means having a rotational driving means for rotating said bead ring circumferentially, an apex feeding means for feeding an apex to a peripheral surface of said bead ring, rotational driving means rotating said bead ring in order to successively apply said apex to said bead ring, means for cutting said apex to a predetermined length and applying said predetermined length of apex to said bead ring, and further comprising:
a chucking means for clamping a trailing end portion of the apex, said chucking means being swingable along a circular arc between a position adjacent a forepart of said apex feeding mechanism, when said apex feeding mechanism is in a retreating position, and a joint position to which a leading end portion of said apex moves with said bead ring during said rotating of said bead ring, so as to bring a trailing end surface of said apex in conformity with and against a leading end surface thereof to form a butt joint of said apex.

* * * * *